US005450416A

United States Patent [19]
Bowcutt et al.

[11] Patent Number: 5,450,416
[45] Date of Patent: Sep. 12, 1995

[54] APPARATUS AND METHOD FOR TESTING MULTIFUNCTION COMMUNICATIONS NETWORKS

[75] Inventors: Roy A. Bowcutt; Stephen M. Igel; Walter P. Krapohl; Pankaj S. Lunia, all of Rochester, Minn.

[73] Assignee: International Business Machines Corporation, Armonk, N.Y.

[21] Appl. No.: 935,072

[22] Filed: Aug. 25, 1992

[51] Int. Cl.⁶ .................. G06F 11/00; H04J 1/16
[52] U.S. Cl. ..................... 371/20.1; 371/20.5; 371/20.4; 370/15
[58] Field of Search .......... 324/539, 541; 379/5; 370/14, 15

[56] References Cited

U.S. PATENT DOCUMENTS

| | | | |
|---|---|---|---|
| 3,594,635 | 7/1971 | Minamii et al. | 324/51 |
| 4,424,421 | 1/1984 | Townsend et al. | 179/175.3 R |
| 4,766,591 | 8/1988 | Huang | 370/60 |
| 4,943,993 | 7/1990 | Fore | 379/6 |
| 4,989,202 | 1/1991 | Soto et al. | 370/13 |
| 4,998,069 | 3/1991 | Nguyen et al. | 324/539 |
| 4,998,240 | 3/1991 | Williams | 370/17 |
| 5,148,435 | 9/1992 | Ray, Jr. et al. | 371/20.5 |
| 5,189,663 | 2/1993 | Williams | 370/17 |
| 5,218,307 | 6/1993 | Hiller | 324/541 |

OTHER PUBLICATIONS

IBM Technical Disclosure Bulletin, vol. 23, No. 3, Aug. 1980, pp. 972–975, "Microprocessor-Controlled Cable Tester", M F Ahonen.
IBM Technical Disclosure Bulletin, vol 22, No. 8A, Jan. 1980, pp. 3334–3335, "Communication Network Testing", G. Immeyer and C. D. van Kampen.

Primary Examiner—Robert W. Beausoliel, Jr.
Assistant Examiner—Trinh Tu
Attorney, Agent, or Firm—J. Michael Anglin

[57] ABSTRACT

An improved apparatus and method for isolating faults in a complex communications network such as a collision-detection network. A wrap plug connected to a communications adapter of a computer system simulates multiple functions of the network environment, rather than a single, hardwired function. A method performs a comprehensive yet convenient diagnostic test of multiple functions of the adapter while a terminal is disconnected from the network.

12 Claims, 5 Drawing Sheets

APPARATUS AND METHOD FOR TESTING MULTIFUNCTION COMMUNICATIONS NETWORKS

BACKGROUND OF THE INVENTION

The present invention relates to electronic communications on a network and an effective method for isolating, and more specifically diagnosing system problems.

A typical collision-detection network, such as an ethernet local-area network (LAN), comprises a computer system or Data Terminal Equipment (DTE) which is attached to a transceiver or Medium Access Unit (MAU) via an Attachment Unit Interface (AUI) and transceiver cable. The MAU is attached to an ethernet coaxial cable bus.

Communication failures in any network may be the result of problems in the attached computer systems, problems with the system's attachment to the bus (transceiver and transceiver cable), or problems with the bus itself. Often errors which are diagnosed as computing system errors are the result of problems within the network or network connections. Excessive time and money have been spent in the resolution of such problems.

In many types of networks, merely disconnecting the DTE from the bus and routing the outgoing DTE data back to its own input data can determine whether or not the failure lies in the DTE. Such conventional "wrap test" methods have been used with collision-detection networks such as ethernet to diagnose a DTE by checking data transmission along the differential outbound and inbound data lines (DO+/DO− and DI+/DI−). A wrap device is attached to the AUI interface to test normal transmit and receive operations of DTE. However, this type of diagnostic test is incomplete. In order to fully isolate and verify the ethernet operation of the computer system, additional testing is needed.

A diagnostic test should verify all commonly used ethernet functions, instead of only transmit and receive operations. Again using ethernet as a paradigm, such functions may also include verification of: collision detection along the inbound control lines (CI+/CI−), continuity on the outbound control lines (CO+/CO−), and the power provided by DTE (VP and Vc). Conventional wrap testers do not test these functions, and thus do not realize the cost savings attributable to more comprehensive network testing.

SUMMARY OF THE INVENTION

The present invention provides an improved apparatus and method for isolating faults in a complex communications petwork such as a collision-detection network. A wrap plug simulates multiple functions of the network environment, rather than a single, hardwired function. A method according to the invention performs a comprehensive yet convenient diagnostic test of multiple functions while a MAU is disconnected from the network. This allows the computer system to exercise and verify all network functions without introducing network-related errors.

A wrap plug according to the invention has an enclosure small enough to be carried in the palm of one's hand. The device is attached to DTE at an AUI interface. A connector includes contacts for the signals passing through the device. The enclosure also contains a switching means which is operated by a mode switch which sets the outbound control signals from the DTE.

The mode switch is located on a communications adapter card connected to the system backplane bus in a conventional manner. When the switching means is in a first position, the inbound and outbound data signals are connected together, simulating a MAU during normal data transmission. When the outbound control signals set the switching means to a second position, the device not only verifies collisions by transmitting the inbound control signals, but also verifies continuity of the outbound control lines and the power lines in the network interface.

Other objects and advantages of the invention, as well as modifications obvious to those skilled in the art, will appear in connection with the following detailed description of a preferred embodiment of the invention.

DESCRIPTION OF A PREFERRED EMBODIMENT

Figure 1:
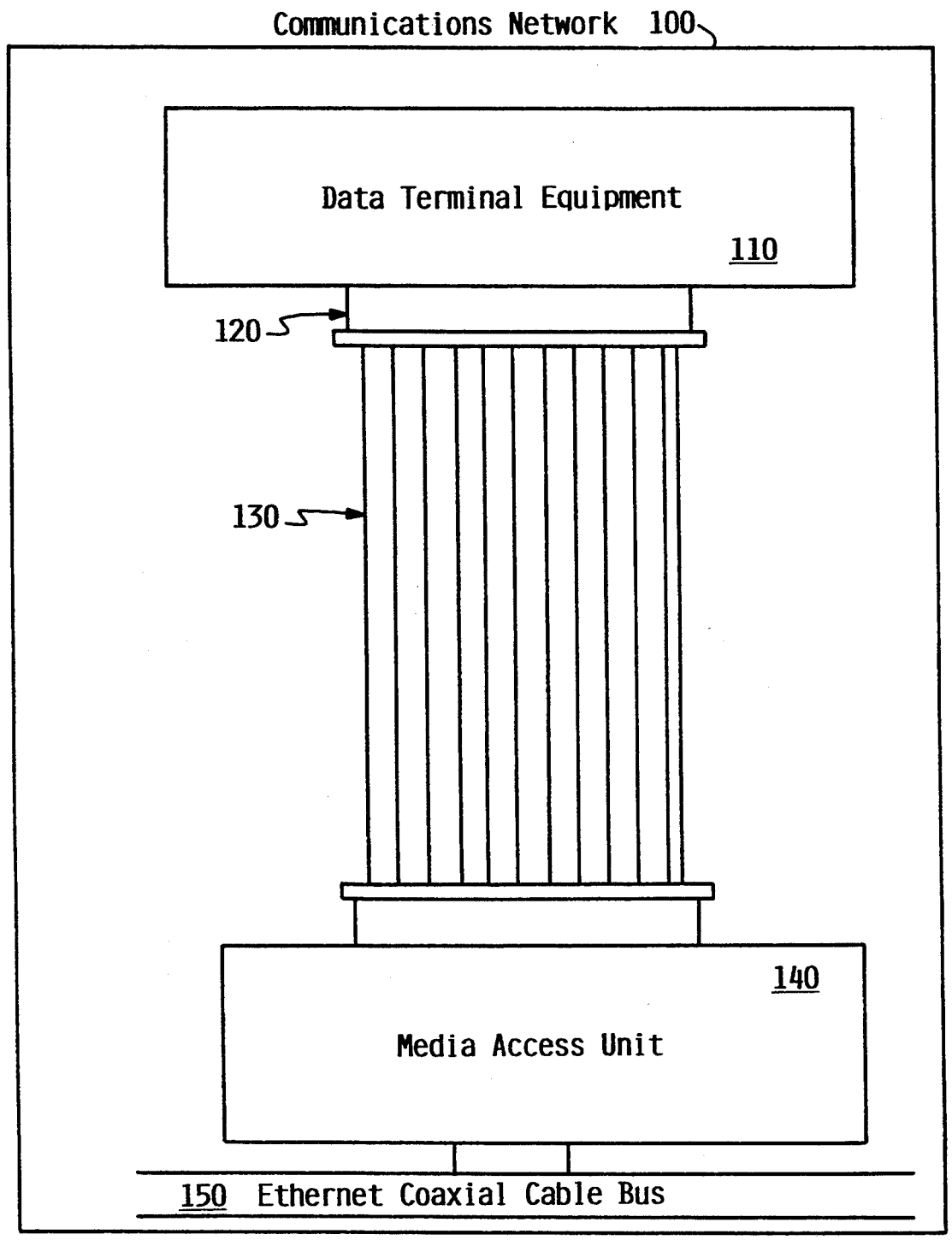
FIG. 1 is a block diagram of a typical communications network serving as an environment for the present invention.

FIG. 1 shows a conventional communications network 100 operating according to the ethernet protocol. Network 100 includes a number of computing systems or Data Terminal Equipment (DTE) units such as 110 connected to a coaxial cable bus 150. DTE 110 transmits data and control signals (see Table 1) through an Attachment Unit Interface (AUI) 120 along the transceiver or AUI cable 130. During data transmission, data will be sent from DTE 110 to the transceiver or Medium Access Unit (MAU) 140 on the outbound differential data pair (DO+/DO−). MAU 140 places the data from the DO+/DO− pins on ethernet cable bus 150. MAU 140 simultaneously listens to the signals on cable 130 and sends this received data on the inbound differential data pair (DI+/DI−). If the output data equals the input data in DTE 110, this provides verification to DTE 110 that MAU 140 is transmitting properly. At this stage of operation, no collision has occurred. Data transmission continues until the entire frame is complete.

TABLE 1

| Name | AUI Pin Definitions Functions |
|---|---|
| DO+/DO− | Data Out-Transmit differential signal pairs (These outbound data lines are used to transmit from DTE to MAU.) |
| DI+/DI− | Data In-Receive differential signal pairs (These inbound data lines are used to transmit from MAU to DTE.) |
| CO+/CO− | Control Out-Control differential signal pair from DTE to MAU (These outbound control lines |

TABLE 1-continued

| | AUI Pin Definitions |
|---|---|
| Name | Functions |
| | are used by DTE to send commands to MAU. Note: The use of these signals are optional; many ethernet implementations do not implement these signals.) |
| CI+/C− | Control In-Control differential signal pair from MAU to DTE (These inbound control lines are used to indicate the presence of a collision on the ethernet network. Signals on these lines are sent from MAU to DTE.) |
| VP | 12 Volt power supplied to MAU from DTE. |
| Vc | 0 Volt return of VP. |

Figure 2:
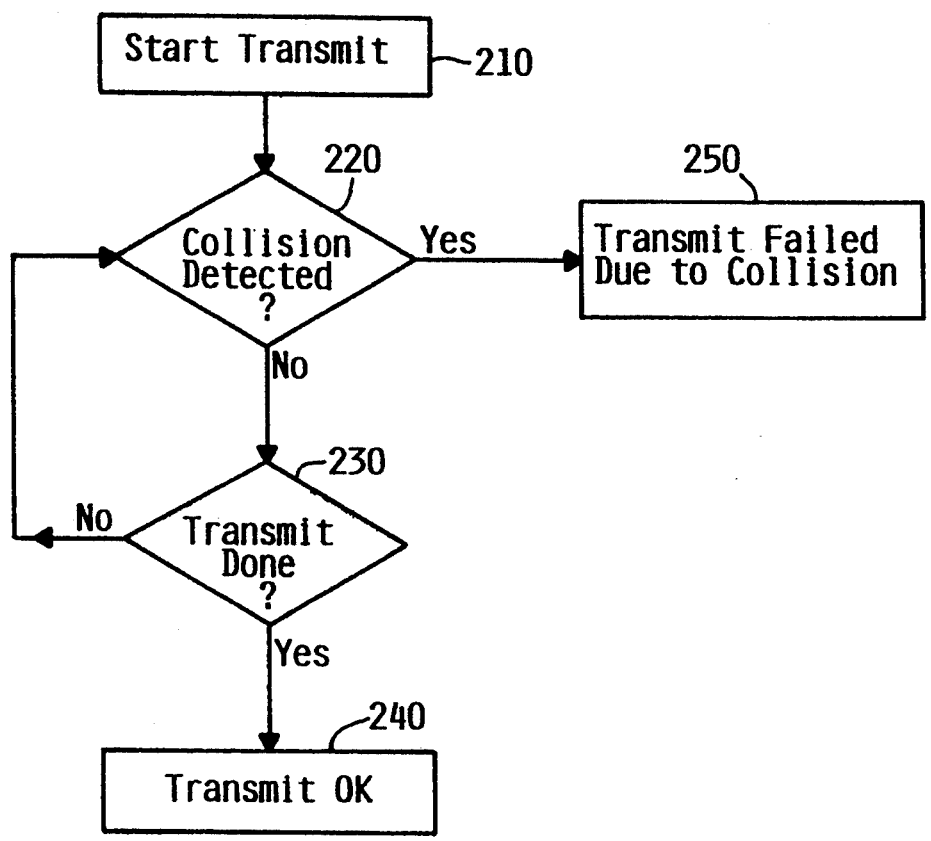
FIG. 2 is a flowchart of a simplified protocol of the network of FIG. 1.

In addition to transmit and receive operations, collision detection is another general ethernet function. FIG. 2 shows a flowchart of a simplified ethernet protocol 200 for collision detection. In block 210, DTE 110, FIG. 1, sends data on the DO+/DO− pins. A collision occurs when more than one MAU 140 transmits simultaneously on the bus 150. If MAU 140 detects a collision on bus 150, MAU 140 will indicate this collision to DTE 110 by sending a signal on the inbound control lines (CI+/CI−). If DTE 110 detects a collision signal in block 220, then transmission fails, block 250. If there is no collision, DTE 110 checks to see if data transmission is complete, block 230. If the frame has not been completely transmitted, DTE 110 checks for another collision. This process continues until the frame is complete, block 240.

Figure 3:
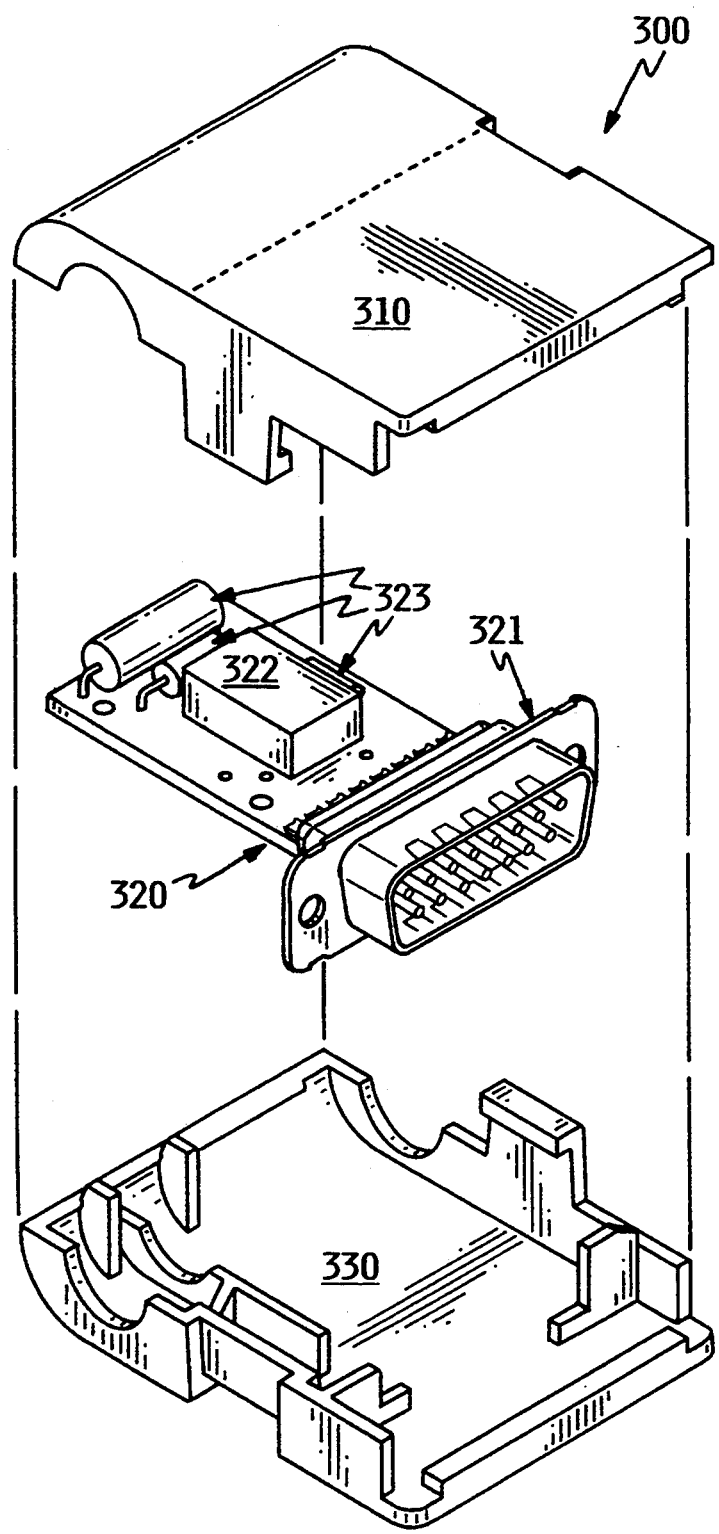
FIG. 3 is an exploded perspective view of the wrap plug according to the invention.

FIG. 3 shows a removable wrap plug 300 according to the invention. Wrap plug 300 comprises three major sections: top surface 310, middle surface 320, and bottom surface 330. The enclosure, comprised of top surface 310 and bottom surface 330, is small enough to be carried in the hand. Surfaces 310 and 330 are about 2" in width and length. The material used to construct these surfaces is plastic. Within enclosure is a middle surface 320 which is a printed circuit card coupled to a removable electrical connector 321. The connector 321 used in this embodiment is a conventional 15-pin D-shell compatible with AUI interface 120 of DTE 110. PC card 320 also carries the electrical components to be described in connection with FIG. 4. These small electrical components are coupled to the appropriate connector pins 321. During test operations, device 300 is attached to DTE 110 at AUI interface 120 as shown in FIG. 4.

Figure 4:
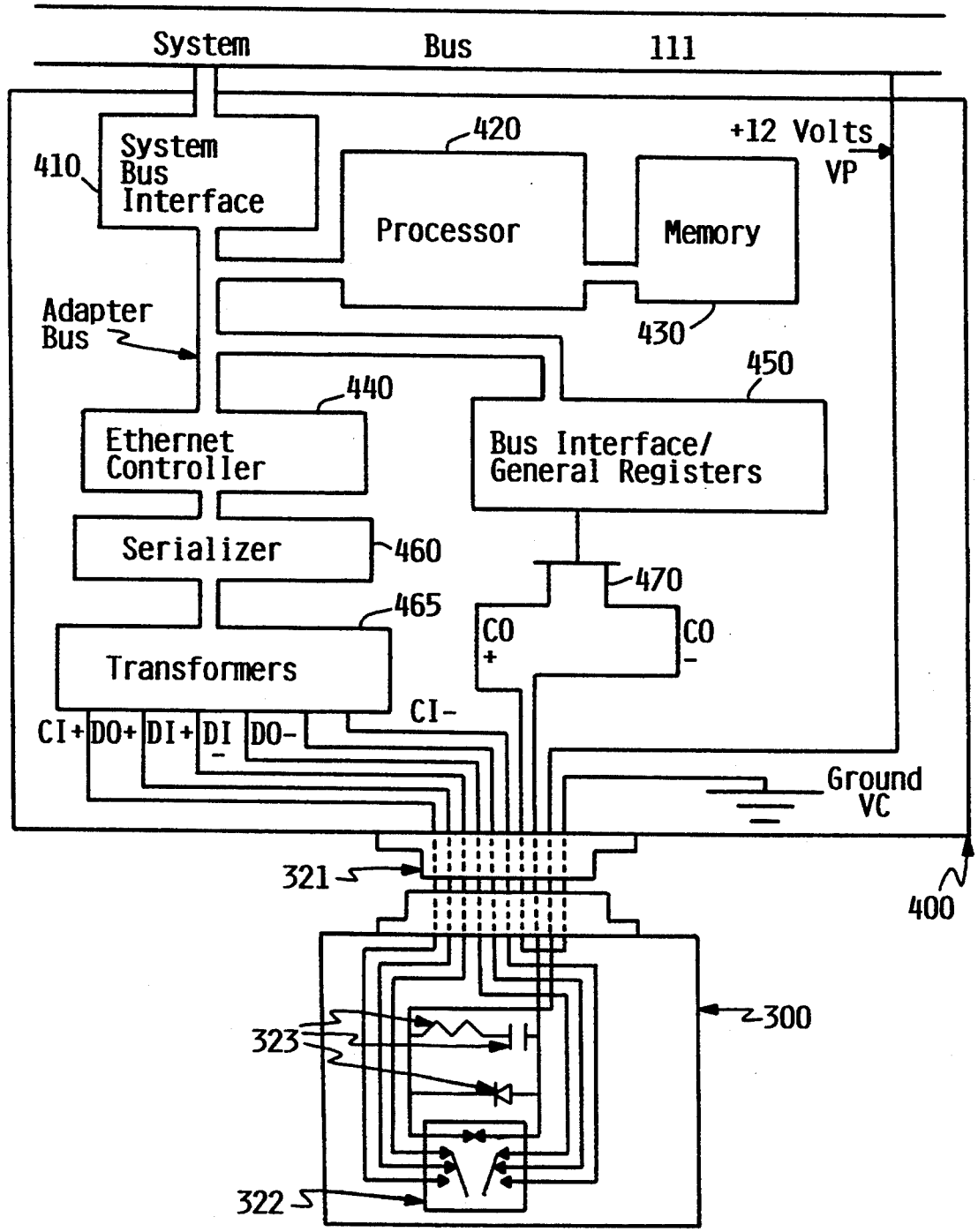
FIG. 4 shows the circuitry of the wrap plug of FIG. 3, along with cooperating components in the DTE of FIG. 1.

FIG. 4 shows a communication adapter card 400, within computer system or DTE 110, which is connected to a system backplane bus 111 in a conventional manner. Using standard interface components including a system bus interface 410, microprocessor 420, memory chip 430, and general registers 450, the data and control signals from DTE 110 are transmitted through an ethernet controller 440 to a serializer 460 and transformers 465. A FET 470 is used as a mode switch to set the outbound control signals (CO+/CO−) which operate relay 322 on wrap plug 300. The data and control signals from transformers 465 and transistor 470 are wired to AUI connector 120 as specified by IEEE 802.3 standards. Device 300 therefore receives these signals and replaces MAU 140 by simulating the network functions of the ethernet environment.

FIG. 4 also shows the internal connections of wrap plug 300. Relay 322 operates as a DPDT switch. One throw of relay 322 is coupled to connector contacts 321 carrying the inbound data signals, DI+/DI−. The center contacts of relay 322 are coupled to the outbound data signals; DO+/DO−. The second throw of relay 322 is coupled to the inbound control signals, CI+/CI−. The coil or control means of relay 322 is connected to the outbound control signals, CO+/CO−. Components 323 (resistor, capacitor, and diode) are connected in a conventional manner so as to protect relay 322 from surges which may energize or deenergize relay coil 322. The switching of device 322 allows the wrap plug 300 to operate in its multiple modes.

Figure 5:
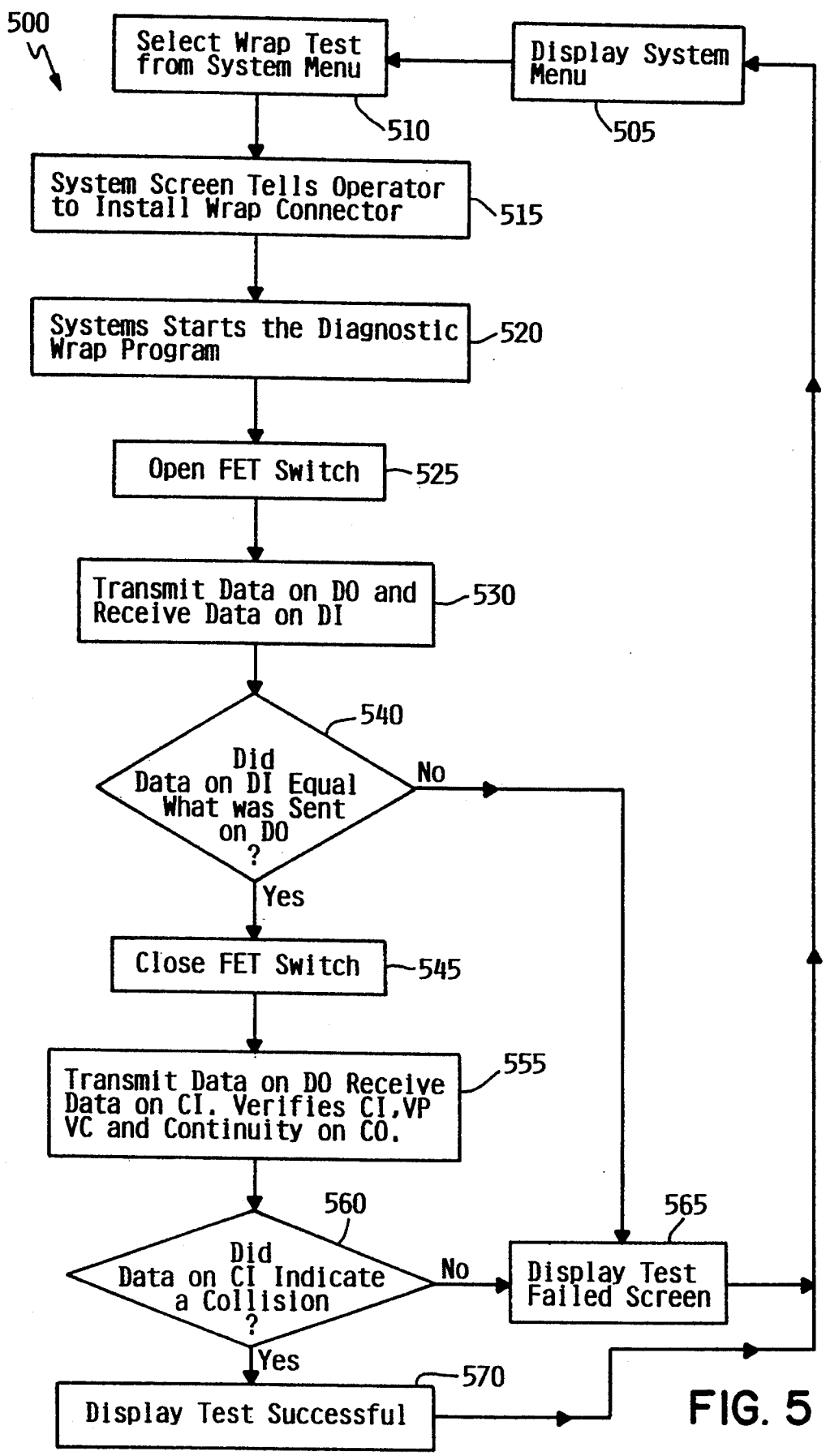
FIG. 5 is a flowchart of a test sequence carried out by the apparatus of FIG. 4.

FIG. 5 shows a flowchart 500 detailing the test sequence utilized by the wrap plug 300. Sequence 500 is performed by a diagnostic program stored in system 110. In this embodiment, a system menu (not shown) is displayed providing the user with an option to select the Wrap Test, block 505, as well as other conventional operating functions. The user can then select the Wrap Test, block 510. If the Wrap Test is selected, the system starts the diagnostic wrap program, block 520. The software used to run the Wrap Test switches transistor 470 between two different modes. Mode switch 470 sets the CO+/CO− lines which operate relay 322 in wrap plug 300.

The wrap plug 300 has two modes. The first mode allows the user to verify normal transmit and receive operations. To set wrap plug 300 for this test, DTE 110 must provide an open connection between CO+ and CO− of AUI interface 120. This is accomplished by opening FET 470 as illustrated in block 525. The open connection sets relay 322 to a first position resulting in connections between the DO+/DO− and DI+/DI− lines. Therefore, when DTE 110 transmits data on DO, it receives data on DI. The wrapping of these signals simulate the normal transit operation of MAU 140 and verifies that the data lines are functioning properly, block 530. This mode is concluded by comparing the data on DI with what was sent on DO, block 540. If the data is not equal, the program displays a "Test Failed" on the computer screen, block 565 and loops the user back to the system menu, block 505.

If the data does match, the second mode begins when DTE 110 provides a closed connection between the CO+ and CO− of the AUI interface 120. This is accomplished by closing FET 470, as illustrated in block 545. The closed connection sets relay 322 to a second position, causing the DO signals to be returned on the CI lines, block 555. When the signal is returned on the CI lines, DTE 110 should interpret it as a collision. The Wrap Test checks to see whether DTE 110 interprets a collision, block 560. If a collision is detected, the program displays "Test Successful," block 570 and loops the user back to the system menu, block 505. If a collision is not detected, the program displays "Test Failed," block 565 and loops the user back to the system menu, block 505.

This second mode not only verifies the CI lines, but also verifies the power provided by DTE 110 and the continuity on CO differential pair. During collision testing, the wrap plug 300 uses the 12 Volts provided by DTE 110. Therefore, if the collision testing is successful, the power and ground signals are also verified on AUI interface 120. Continuity on the CO+/CO− lines is verified through switching of the relay 322. If no power was provided by DTE 110, then relay 322 would not switch. Thus, the testing sequence 500 would indicate a "Test Failed" on the display screen, block 565.

Having described a preferred embodiment thereof, we claim as our invention:

1. A method of testing a communications adapter having an adapter connector attached to an electronic system normally transmitting at least inbound and outbound data signals and inbound and outbound control signals to a communications interface for a collision-detection network, said method comprising:
   a) disconnecting said communications interface from said adapter connector;
   b) attaching to said adapter connector a removable wrap plug having means for selectively coupling a line normally carrying said outbound data signal either to a line carrying said inbound data signal or to a line carrying said inbound control signal in response to a first or second mode of said outbound control signal;
   c) causing said system to set said first mode of said outbound control signal, and then to send first preselected test data from said communications adapter to said communications adapter via said line normally carrying said outbound data signal;
   d) thereafter, monitoring said inbound data signal so as to detect a first response of said system to said first preselected test data, for indicating whether a first mode of said adapter operates correctly;
   e) causing said system to set said second mode of said outbound control signal, and then to send second preselected test data from said communications adapter to said communications adapter via said line normally carrying said outbound data signal;
   f) thereafter, monitoring said inbound data signal so as to detect a second response of said system to said second preselected test data, for indicating whether a second mode of said adapter operates correctly;
   g) producing an error indication if either said response indicates an error condition.

2. The method of claim 1 wherein said collision-detection network uses an ethernet communications protocol.

3. The method of claim 1 wherein said steps (c) and (e) comprise throwing an internal switching means to change modes.

4. The method of claim 3 wherein said communications port uses a mode switch to control said switching means.

5. The method of claim 1 further comprising the step of monitoring continuity on said outbound control signal and the power supplied by the system.

6. A wrap tester for a communications adapter of an electronics system, said electronics system having an attachment interface normally connected to a medium access unit of a communications network and exchanging therewith at least four signals, said four signals including first and second data signals, an outbound control signal having first and second modes, and a further signal, said tester comprising:
   an enclosure small enough to be carried in a hand;
   a removable electrical connector within said enclosure and physically connected to said attachment interface, said connector including connector contacts for carrying at least said four signals;
   switching means mounted within said enclosure, said switching means having first and second throw contacts, a center contact, and a control means for switching said center contact between said first and said second throw contacts;
   wiring means within said enclosure for coupling said control means to that one of said connector contacts carrying said outbound control signal, for coupling said center contact to that one of said connector contacts carrying said first data signal, for coupling said second throw contact to said connector contact carrying said second data signal, and for coupling said first throw contact to that one of said connector contacts carrying said further signal, such that said tester selectively returns said first data signal as said second data signal or as said further signal, in response to said first or second modes of said outbound control signal respectively, thereby testing a proper operation of said communications adapter with respect to said four signals.

7. The tester of claim 6 wherein said further signal is an inbound control signal, and wherein said four signals implement a collision-detection communications protocol.

8. The tester of claim 7 wherein said communications protocol is an ethernet protocol.

9. The tester of claim 7 wherein said switching means is a relay.

10. The tester of claim 7 wherein said control means is responsive to a mode switch in said communications adapter.

11. The tester of claim 6 wherein said connector further includes contacts carrying power from said communications adapter, and wherein said wiring means further couples said power to at least one of said four signals such that delivery of power verifies continuity of said one signal.

12. The tester of claim 11, wherein said one signal is said outbound control signal.

* * * * *